US009738445B2

(12) United States Patent
Foster

(10) Patent No.: US 9,738,445 B2
(45) Date of Patent: Aug. 22, 2017

(54) ROLL OUT CART WITH GRAVITY LOCK

(71) Applicant: Rehrig Pacific Company, Los Angeles, CA (US)

(72) Inventor: Derick Foster, Cumming, GA (US)

(73) Assignee: Rehrig Pacific Company, Los Angeles, CA (US)

( * ) Notice: Subject to any disclaimer, the term of this patent is extended or adjusted under 35 U.S.C. 154(b) by 0 days.

(21) Appl. No.: 15/095,823

(22) Filed: Apr. 11, 2016

(65) Prior Publication Data

US 2017/0022005 A1 Jan. 26, 2017

Related U.S. Application Data

(60) Provisional application No. 62/146,074, filed on Apr. 10, 2015.

(51) Int. Cl.
| | |
|---|---|
| *B62B 1/00* | (2006.01) |
| *B65F 1/16* | (2006.01) |
| *B62B 1/16* | (2006.01) |
| B65F 1/14 | (2006.01) |
| B65F 1/12 | (2006.01) |

(52) U.S. Cl.
CPC .............. *B65F 1/1615* (2013.01); *B62B 1/16* (2013.01); *B65F 1/1452* (2013.01); *B65F 1/122* (2013.01); *B65F 1/1473* (2013.01); *B65F 1/1646* (2013.01)

(58) Field of Classification Search
CPC .............................. B65F 1/1615; B65F 1/1646
See application file for complete search history.

(56) References Cited

U.S. PATENT DOCUMENTS

| | | | |
|---|---|---|---|
| 3,490,637 A | 1/1970 | Pope | |
| 4,319,762 A | 3/1982 | Streit et al. | |
| 4,384,656 A | 5/1983 | McQuiston et al. | |
| 5,490,606 A | 2/1996 | Lombardo | |
| 6,350,418 B1 | 2/2002 | Venderpool et al. | |
| 7,073,677 B2 | 7/2006 | Richardson et al. | |
| 7,559,433 B2 | 7/2009 | Yang et al. | |
| 9,346,616 B2 | 5/2016 | Foster | |
| 2007/0175910 A1* | 8/2007 | Hogarth ................ | B65F 1/1615 220/835 |
| 2009/0223965 A1 | 9/2009 | Raghunathan et al. | |
| 2014/0299619 A1 | 10/2014 | Foster | |
| 2017/0022005 A1 | 1/2017 | Foster | |
| 2017/0022006 A1 | 1/2017 | Foster | |

* cited by examiner

*Primary Examiner* — John Walters
*Assistant Examiner* — James Triggs
(74) *Attorney, Agent, or Firm* — Carlson, Gaskey & Olds PC

(57) ABSTRACT

A waste container includes a body portion including an outer wall extending upward from a base wall. A lid is pivotably secured to the body portion. A latch assembly selectively secures the lid to the body portion. The latch assembly includes a handle rotatably mounted to the lid and connected to a lower actuator portion. The lower actuator portion has a disk portion with at least one cam portion. The disk portion is rotatable upon rotation of the handle by a user. Rotation of the cam portion selectively releases the latch assembly securing the lid to the body portion.

22 Claims, 10 Drawing Sheets

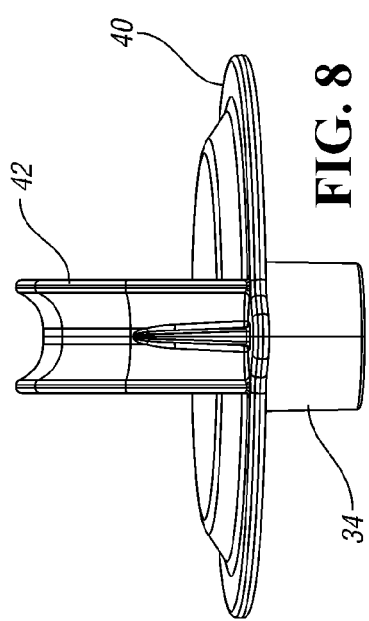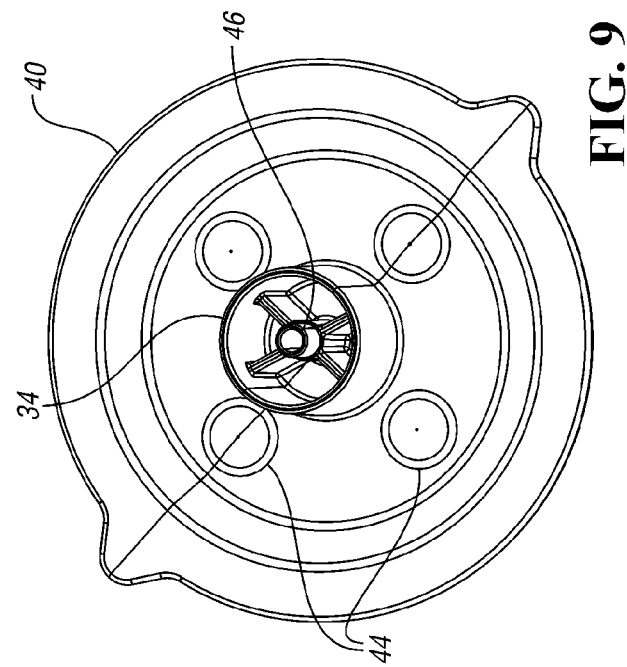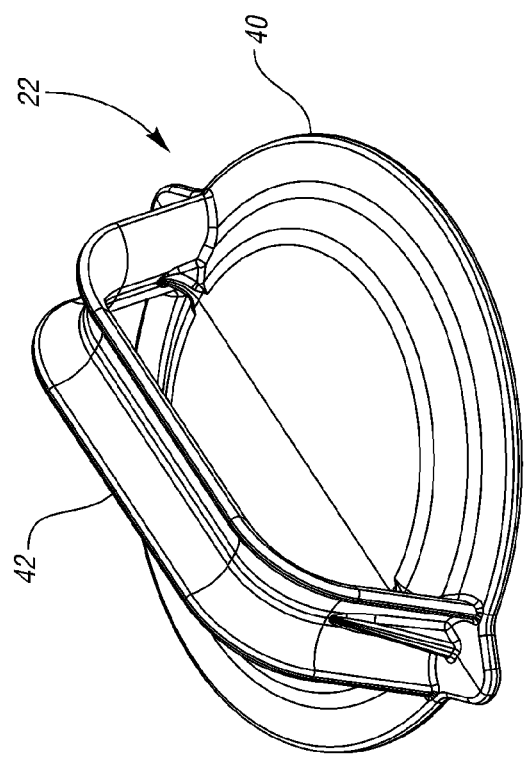

_US 9,738,445 B2_

ROLL OUT CART WITH GRAVITY LOCK

BACKGROUND

Waste containers, such as for trash, recycling, or organic waste (compost), etc., often attract the interest of animals, such as rodents, dogs, raccoons, etc. Many containers include lids that latch, but some animals can pry under the lid and force the container open.

For areas where the collection trucks include cart lifters, the containers might become damaged if they are lifted and dumped while latched.

SUMMARY

A waste container includes a body portion including an outer wall extending upward from a base wall. A lid is pivotably secured to the body portion. A latch assembly selectively secures the lid to the body portion. The latch assembly includes a handle rotatably mounted to the lid and connected to a lower actuator portion. The lower actuator portion has a disk portion with at least one cam portion. The disk portion is rotatable upon rotation of the handle by a user. Rotation of the cam portion selectively releases the latch assembly securing the lid to the body portion.

Optionally, an upper surface of the lid and a lower surface of the handle including interfering projections that inhibit positioning the handle in an unlatched position. Optionally, the lid may include a plurality of reinforcement ribs extending downward from the upper panel portion. The reinforcement ribs are spaced away from side edges of the lid.

BRIEF DESCRIPTION OF THE DRAWINGS

FIG. 7 is a top perspective view of the handle of the container of FIG. 1.

FIG. 8 is a side view of the handle of FIG. 7.

FIG. 9 is a bottom view of the handle of FIG. 7.

DETAILED DESCRIPTION OF THE DRAWINGS

Figure 1:
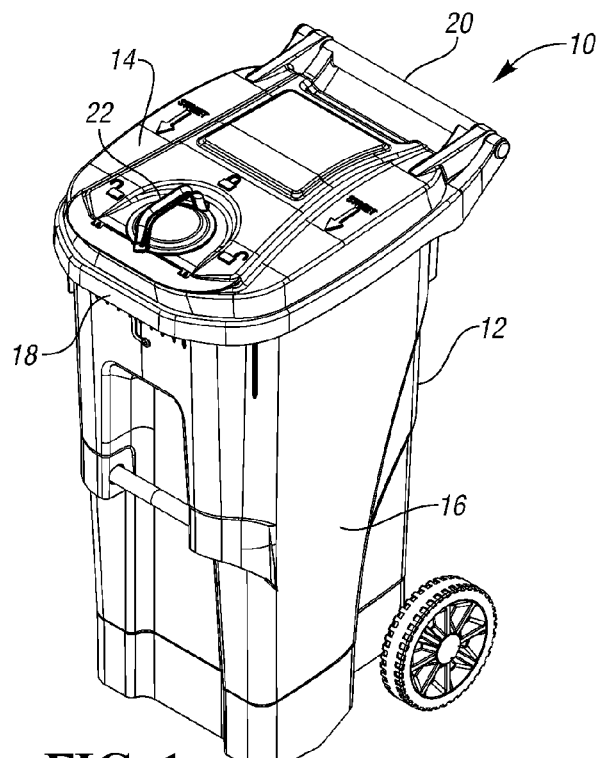
FIG. 1 is a perspective view of a waste container according to one embodiment.

A waste container 10, more specifically a roll out container 10, is shown in FIG. 1. The waste container 10 includes a body portion 12 and a lid 14. The body portion 12 includes an outer wall 16 extending upward from a base wall to a mouth of the body portion 12 which is selectively covered by the lid 14. An upper edge of the body portion 12 includes a lip 18 projecting outward and then downward. A rotatable handle 22 is secured to the lid 14 and selectively latches and unlatches the lid 14 to the body portion 12, for example, to keep rodents from accessing the contents of the container 10. The lid 14 is hingeably connected to a handle portion 20 spaced rearwardly of an upper edge of the body portion 12.

Figure 2:
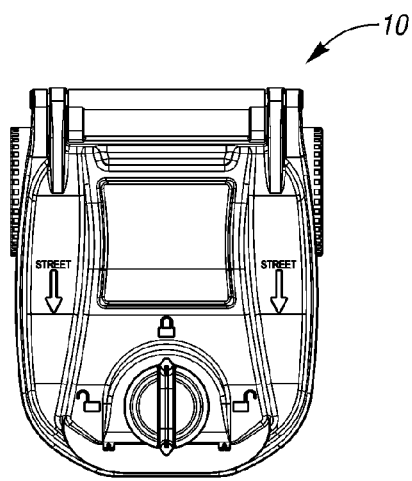
FIG. 2 is a top view of the container of FIG. 1.
Figure 3:
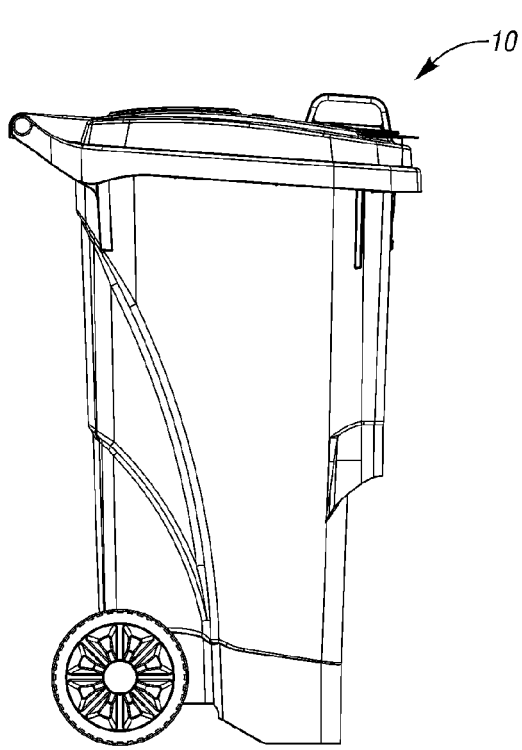
FIG. 3 is a side view of the container of FIG. 1.
Figure 4:
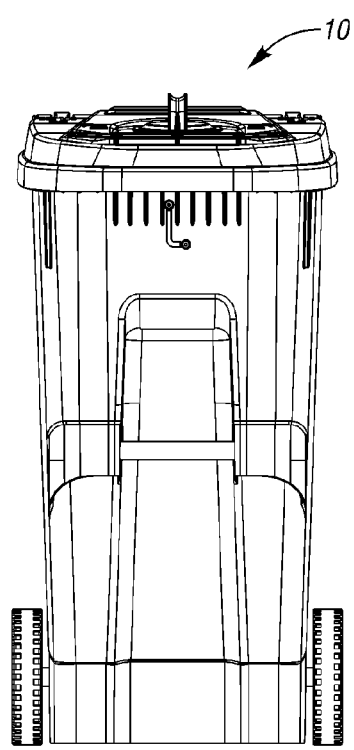
FIG. 4 is a front view of the container of FIG. 1.

FIG. 2 is a top view of the container 10. FIG. 3 is a side view. FIG. 4 is a rear view.

Figure 5:
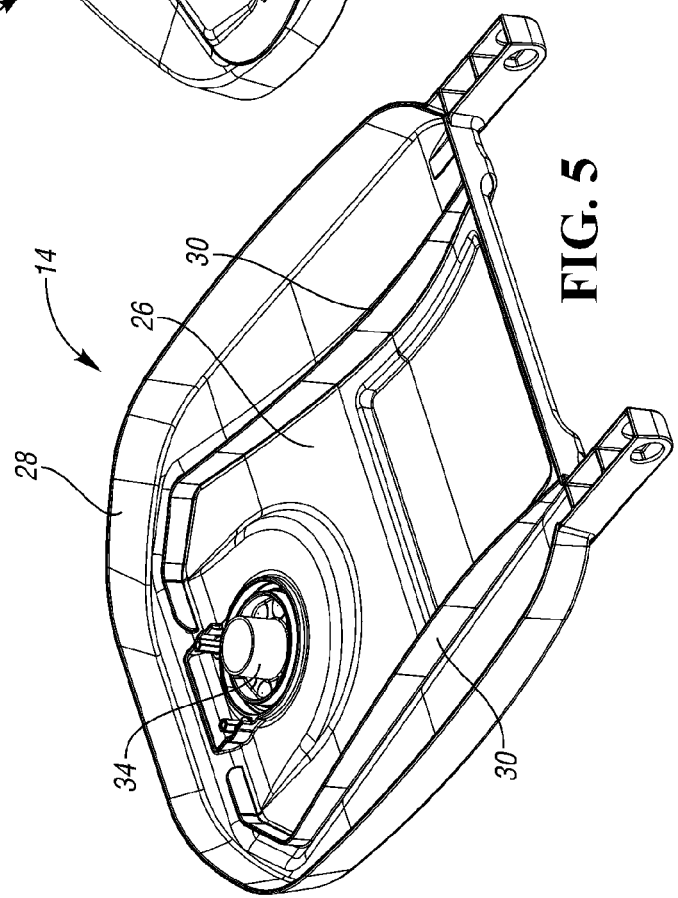
FIG. 5 is a bottom perspective view of the container of FIG. 1.

FIG. 5 is a bottom perspective view of the lid 14. The lid 14 generally includes an upper panel 26 and a lip 28 projecting downward from an outer periphery of the upper panel 26. Reinforcement ribs 30 extend downward from the upper panel 26, from a rear edge of the lid 14 and then curve inward toward one another proximate the front of the lid 14. The reinforcement ribs 30 are spaced about ¼ of the width of the lid 14 from the side edges of the lid 14. A lower portion 34 of the handle 22 (FIG. 4) extends downward from the lid 14 proximate the front of the lid 14.

Figure 6:
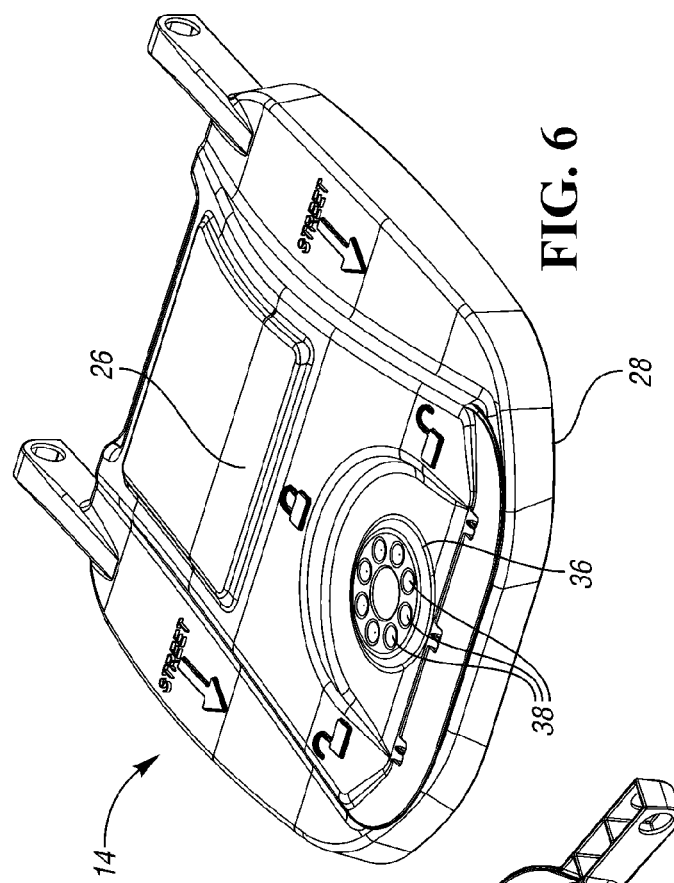
FIG. 6 is a top perspective view of the lid of the lid of FIG. 5.

FIG. 6 is a top perspective view of the lid 14 without the handle 22 (FIG. 1) or lower portion 34 of the handle 22 (FIG. 5). The upper panel portion 26 has a circular raised portion 36 surrounding the opening through the upper panel portion 26. The raised portion 36 includes a plurality of raised bosses 38 that interact with the lower surface of the rotatable handle 22 so that the handle 22 will resist turning out of an unlocked position and will return to an unlocked position (away from one of the bosses 38) when the handle 22 is released.

FIGS. 7-9 show the handle 22 having a grip portion 42 with a U-shaped cross-section, with the U-shape opening upward. The handle 22 includes a disk portion 40 having a lower surface on which upper bosses 44 are formed. The upper bosses 44 are formed radially outward of a cylindrical portion projecting downward from the center of the disk portion 40. The upper bosses 44 are configured to interact with the bosses 38 on the upper panel portion 26 of the lid 14 (FIG. 6). Alternatively, complementary bosses and recesses on the upper panel portion 26 and the lower surface of the handle 22 (or vice versa) could also be used.

Figure 9A:
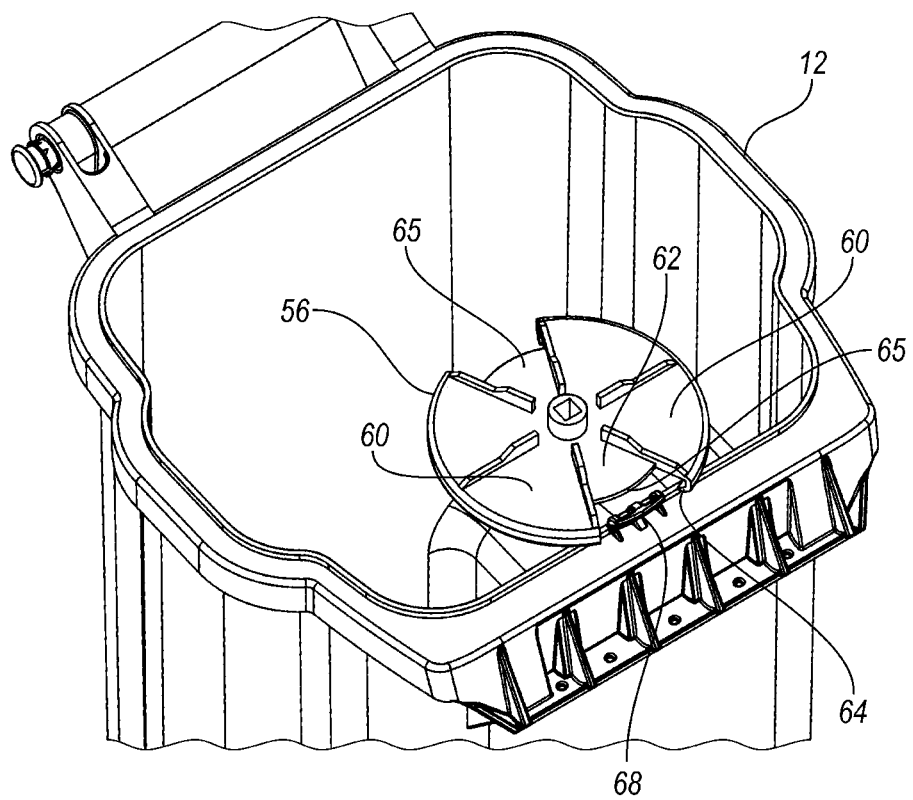
FIG. 9A shows an example manual latch mechanism that could be used with the container and latch of FIGS. 1-9.

The rotatable handle 22 and the interaction of the bosses could be used with latch mechanisms of different types, including an interference latch as show in FIG. 9A or the latching mechanism described with respect to FIGS. 10-16 below. FIG. 9A shows a lower latch portion 56 of an interference latch that could be connected to the grip portion 42. FIG. 9A shows the container body 12 with the lower latch portion 56 of the latch in the unlocked position. The lower latch portion 56 is generally disc-shaped and includes large diameter portions 60 and small diameter portions 62. Notches are defined between the large diameter portions 60, outward of the small diameter portions 62. In this example, the large diameter portions together occupy approximately ⅔ of the circumference of the lower latch portion 56, while the two opposed small diameter portions 62 together comprise approximately the remaining ⅓ of the circumference of the lower latch portion 56 (approximately 60° each). Alternatively, a single small diameter portion 62 could be provided. Further, alternatively, the larger diameter portions 60 and small diameter portions 62 could have different relative sizes, depending upon the application or depending upon user preferences.

A latch member 64 protrudes downwardly and radially inwardly from an outer periphery of the larger diameter portions 60 of the lower latch portion 56. As shown, the latch member 64 may be arcuate. A forward facing hook 68 is formed adjacent an upper edge of the container body 12. When the lower latch portion 56 (via grip portion 42 of FIG. 9) is rotated such that the larger diameter portions 60 are aligned with the hook 68, the hook 68 engages the latch member 64 of the lower latch portion 56 thus, latching the lid 14 to the container body 12. When the smaller diameter portions 62 are aligned with hook 68, the front of the lid 14 is released from the container body 12. Other latch mechanisms could also be used.

Figure 10:
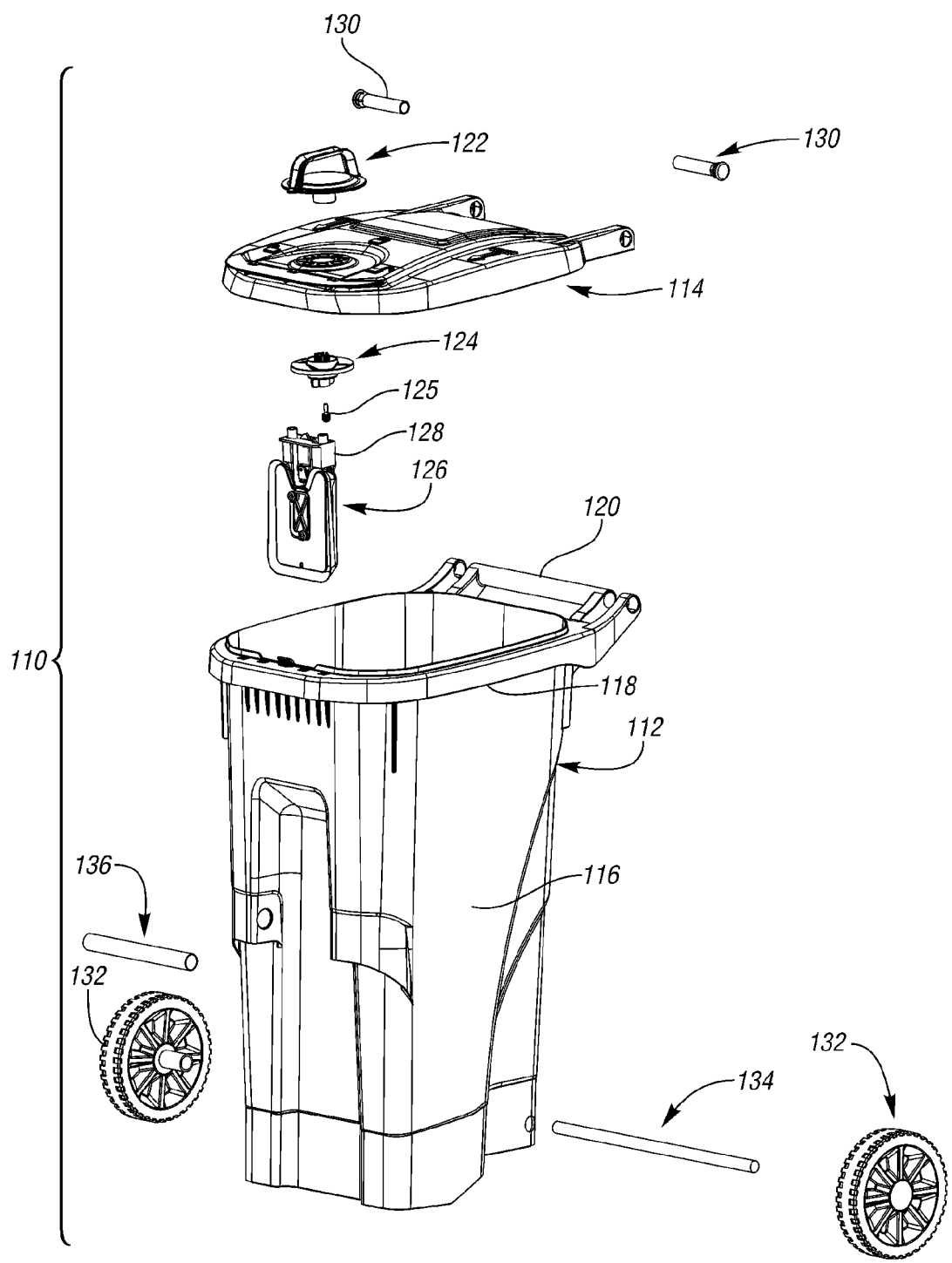
FIG. 10 is an exploded view of a waste container according to a second embodiment.

FIG. 10 is an exploded view of a waste container 110 incorporating a gravity latch mechanism. The waste container 110 includes a body portion 112 and a lid 114. The body portion 112 includes an outer wall 116 extending upward from a base wall to a mouth of the body portion 112 which is selectively covered by the lid 114. An upper edge of the body portion 112 includes a lip 118 projecting outward and then downward. The lid 114 is hingeably connected to a handle portion 120 spaced rearwardly of an upper edge of the body portion 112. A latch assembly includes an upper actuator portion 122 secured to a lower actuator portion 124 on either side of the lid 114. The latch assembly further includes a gravity latch assembly including an upper latch portion 128 (to be attached to the lid 114) and a lower latch portion 126 (to be attached to the body portion 112). As will be explained below, rotation of the upper actuator portion 122 rotates the lower actuator portion 124, which in turn selectively causes the upper latch portion 128 to connect and disconnect from the lower latch portion 126 to selectively latch and unlatch the lid 114 to the body portion 112. The latch keeps rodents from accessing the contents of the container 110. The waste container 110 may optionally include wheels 132 connected to the body portion 112 by an axle 134 and a front handle 136.

Figure 11:
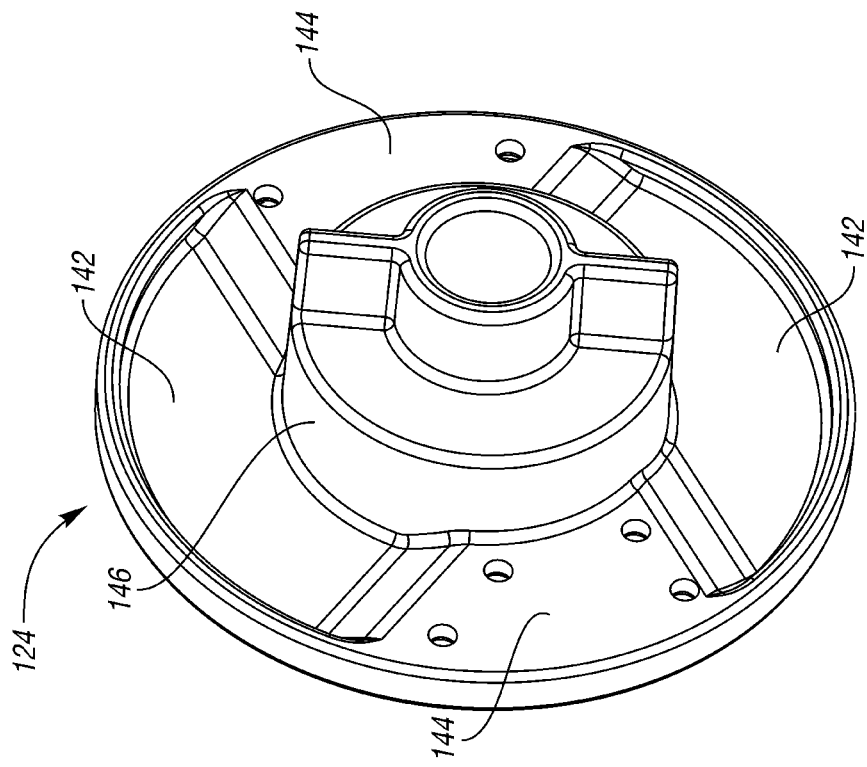
FIG. 11 is a bottom perspective view of the lower actuator of the container of FIG. 10.
Figure 12:
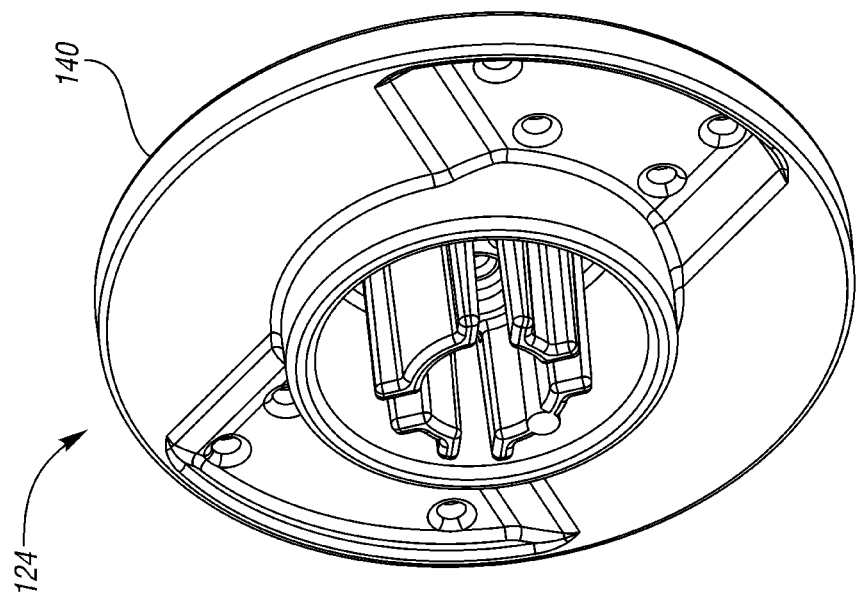
FIG. 12 is a top perspective view of the lower actuator of FIG. 11.

FIGS. 11 and 12 are bottom and top perspective views of the lower actuator portion 124, respectively. The lower surface of a disk portion 140 of the lower actuator portion 124 includes alternating cam portions 142 and recessed portions 144 radially outward of a cylindrical wall 146 that projects downward. Drainage holes may be formed through the disk portion 140 for draining water out of the latch assembly.

Figure 13:
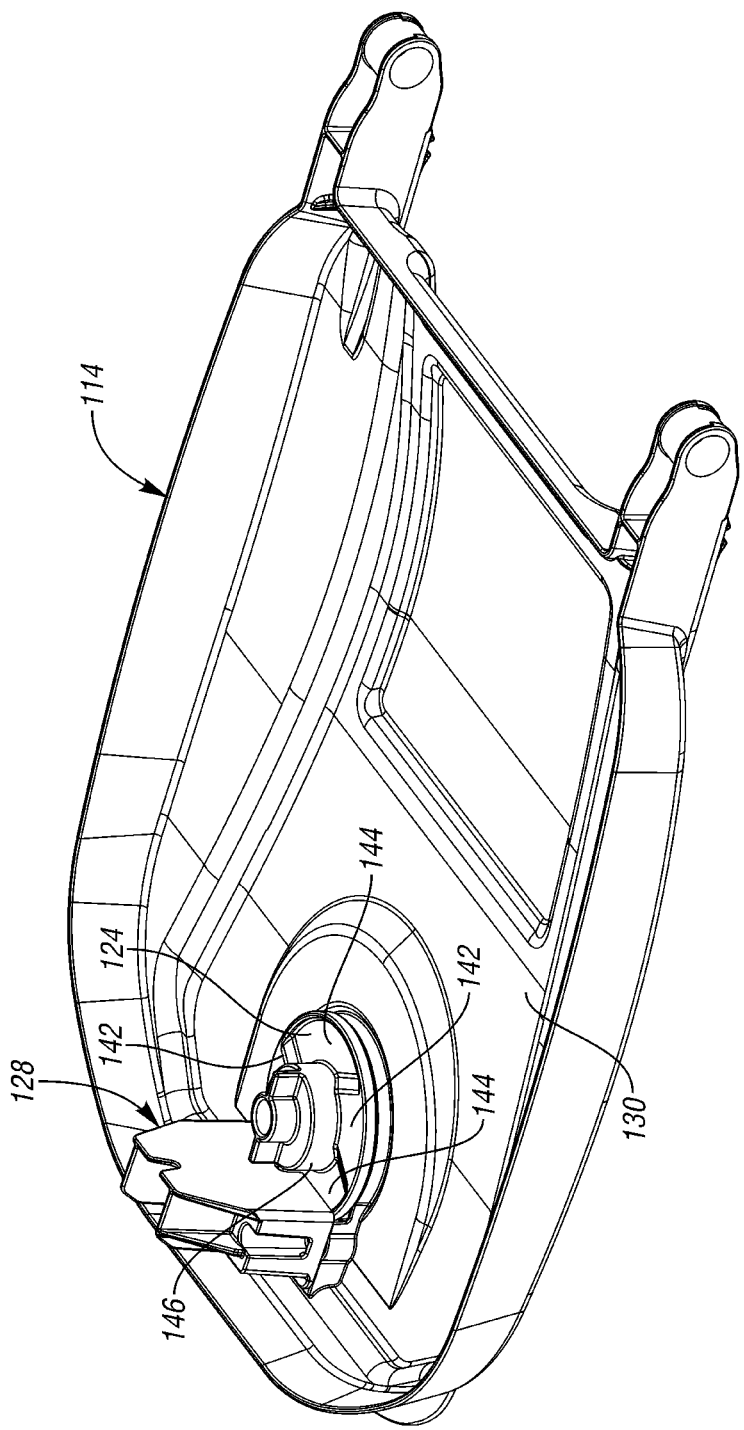
FIG. 13 is a bottom perspective view of the lid, lower actuator portion and upper latch portion of the container of FIG. 10.

FIG. 13 is a bottom perspective view of the lid 114 with the lower actuator portion 124 and upper latch portion 128 installed. As shown, the disk portion 140 of the lower actuator portion 124 is positioned between the upper panel 130 of the lid 114 and the upper latch portion 128. The cylindrical wall 146 is adjacent the upper latch portion 128.

Figure 14:
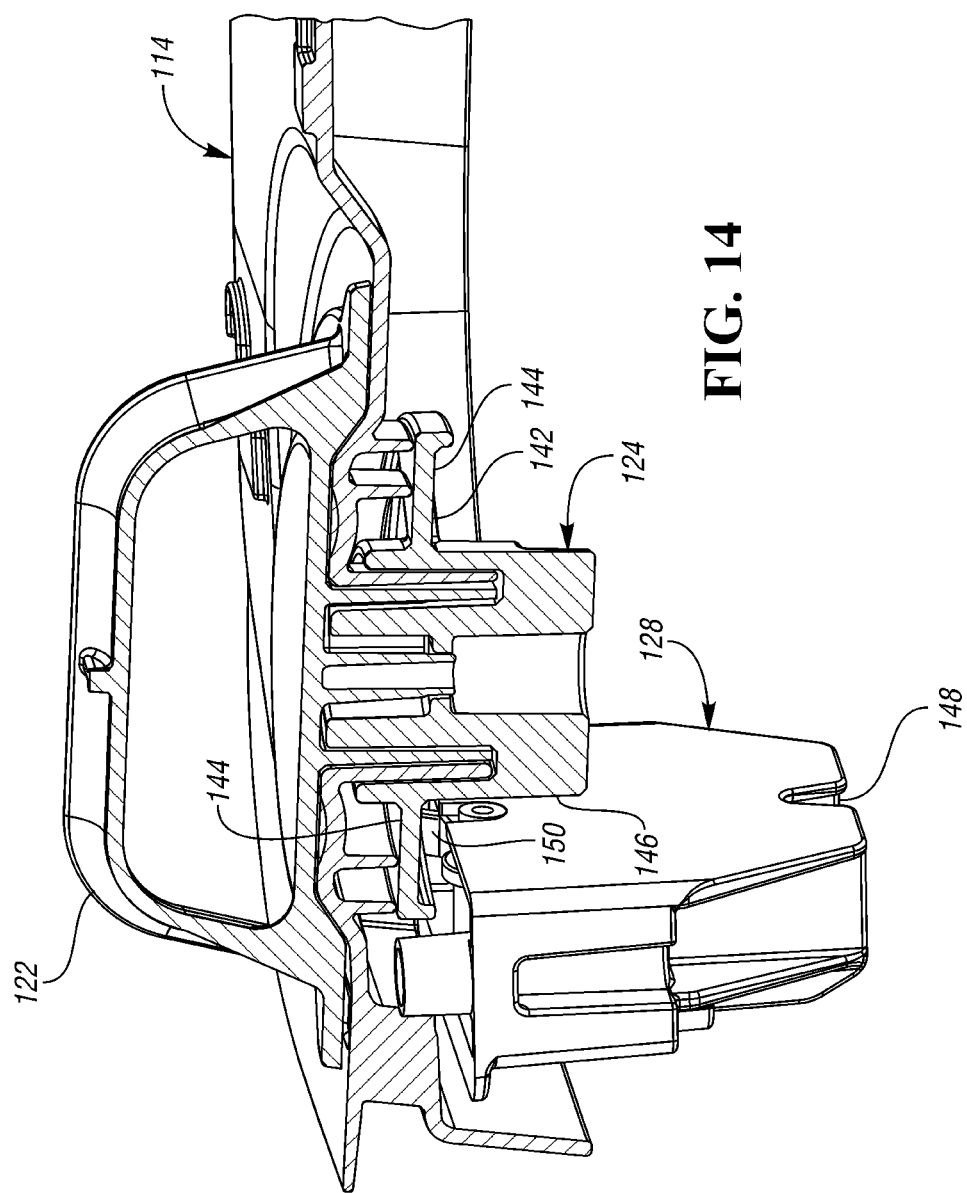
FIG. 14 is a cut-away view through the latch of the container of FIG. 10.
Figure 15:
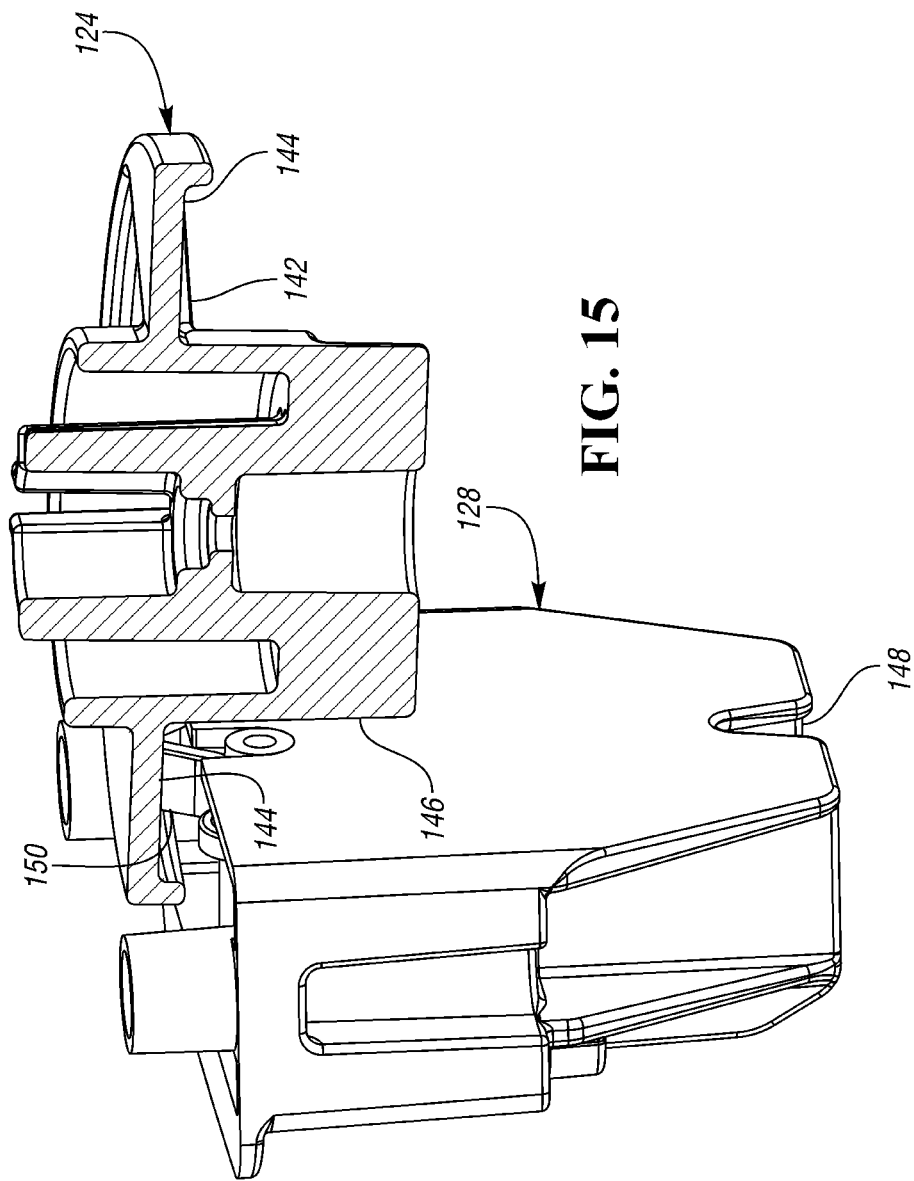
FIG. 15 shows just the lower actuator portion and upper latch portion of FIG. 14.
Figure 16:
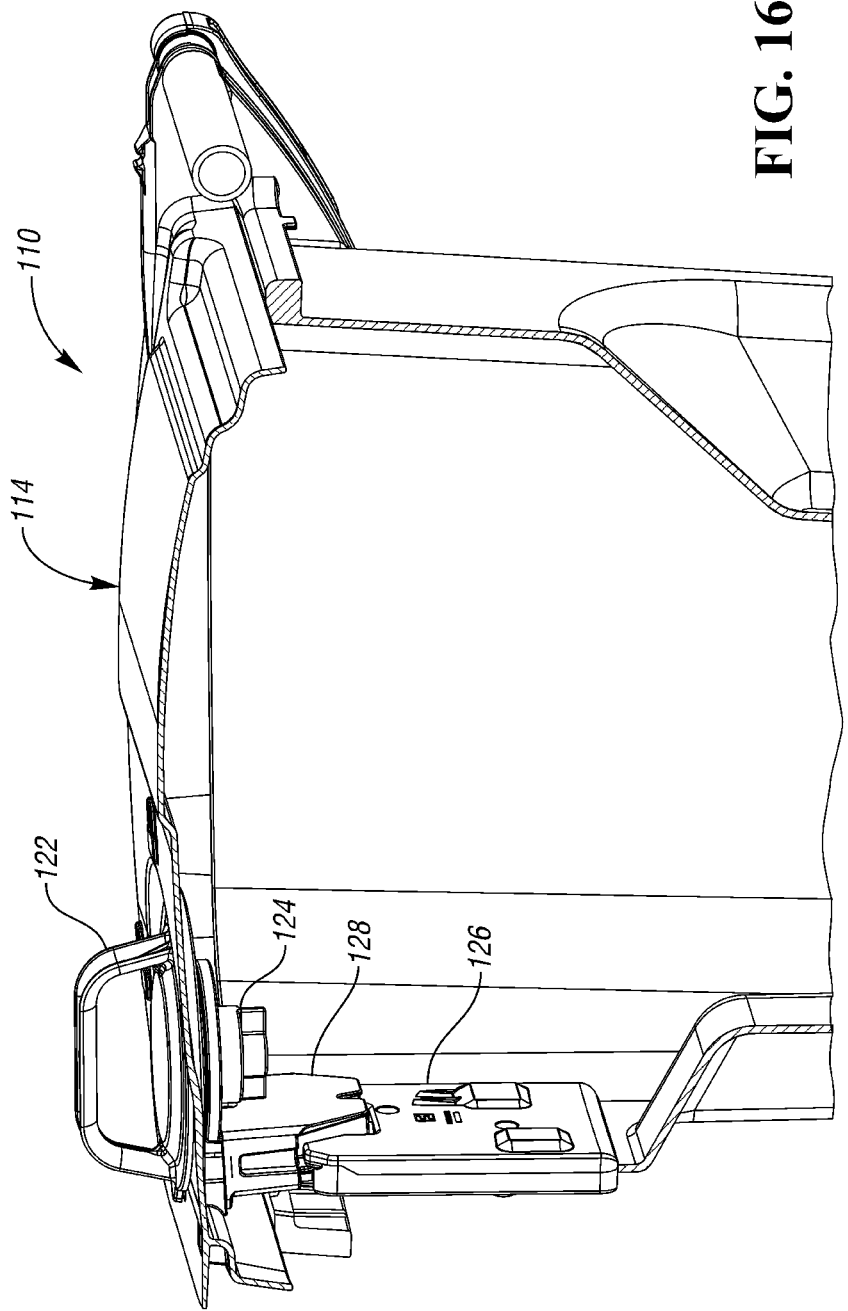
FIG. 16 shows the assembly of FIG. 14 in the latched position.

Referring to FIGS. 14 and 15, when the upper actuator portion 122 is rotated (by its handle), the lower actuator portion 124 rotates as well. When one of the cam portions 142 contacts an actuating lever 150 of the upper latch portion 128, the actuating lever 150 is displaced vertically downward, causing a latch 148 at the bottom of the upper latch portion 128 is released. Referring to FIG. 16, this would release the upper latch portion 128 from the lower latch portion 126, such that the lid 114 can be lifted open.

The upper latch portion 128 and lower latch portion 126 together are a gravity actuated latch, such that when the container 110 is inverted, gravity causes the lower latch portion 126 to release from the upper latch portion 128. The latch is also released manually by moving the actuating lever 150, typically with a key. Such gravity latches are commercially available, such as the trash bin gravity lock available from Franzen International.

This embodiment provides a rodent-resistant latch that works with a gravity actuated latch.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A waste container comprising:
   a body portion including an outer wall extending upward from a base wall;
   a lid; and
   a latch assembly selectively securing the lid to the body portion, the latch assembly including a handle rotatably mounted to the lid and connected to a lower actuator portion having a disk portion, the disk portion having a lower surface having at least one cam portion projecting downward, such that the disk portion is rotatable upon rotation of the handle by a user and such that rotation of the at least one cam portion selectively releases the latch assembly securing the lid to the body portion.

2. A waste container comprising:
   a body portion including an outer wall extending upward from a base wall;
   a lid; and
   a latch assembly selectively securing the lid to the body portion, the latch assembly including a handle rotatably mounted to the lid and connected to a lower actuator portion having a disk portion having at least one cam portion, such that the disk portion is rotatable upon rotation of the handle by a user and such that rotation of the cam portion selectively releases the latch assembly securing the lid to the body portion, wherein the latch assembly further includes an upper latch portion and a lower latch portion, the upper latch portion including an actuating lever, the cam portion of the disk portion is configured to actuate the actuating lever and release the upper latch portion from the lower latch portion.

3. The waste container of claim 2 wherein the cam portion is configured to displace the actuating lever vertically upon rotation of the disk portion.

4. The waste container of claim 3 wherein the disk portion includes a plurality of cam portions, each of the plurality of cam portions configured to actuate the actuating lever upon rotation of the disk portion.

5. The waste container of claim 1 wherein the lid is hingeably connected to a handle portion spaced rearwardly of an upper edge of the body portion.

6. The waste container of claim 5 further including a plurality of wheels rotatably connected to the body portion.

7. A waste container comprising:
   a body portion including an outer wall extending upward from a base wall;
   a lid; and
   a latch assembly selectively latching and unlatching the lid to the body portion, the latch assembly including a handle rotatably mounted to the lid and configured to selectively latch and unlatch the latch assembly upon rotation of the handle, an upper surface of the lid and a lower surface of the handle including interfering portions that are positioned to interact with one another to resist rotation of the handle out of an unlatched position.

8. The waste container of claim 7 wherein the interfering portions include a plurality of convex surfaces on the upper surface of the lid and the lower surface of the handle.

9. The waste container of claim 7 wherein the interfering portions include a plurality of bosses on the upper surface of the lid and the lower surface of the handle.

10. A waste container comprising:
a body portion including an outer wall extending upward from a base wall;
a lid pivotably secured to the body portion, the lid including an upper panel portion and a lip projecting downward from a periphery of the upper panel portion, a plurality of reinforcement ribs extending downward from the upper panel portion, the reinforcement ribs extending forwardly from the lip at a rearward edge of the lid and spaced away from side edges of the lid.

11. The waste container of claim 10 wherein the reinforcement ribs extend from a rearward edge of the lid and then curve toward one another proximate a front of the lid.

12. The waste container of claim 1 wherein the lower surface of the disk portion includes a recessed portion adjacent the cam portion, the cam portion including a ramp portion adjacent the recessed portion.

13. The waste container of claim 1 wherein at least one cam portion vertically displaces a first component of the latch assembly upon rotation of the disk portion to selectively release the latch assembly.

14. The waste container of claim 1 wherein the outer wall of the body portion includes a front portion opposite a rear portion, the lid hingeably mounted proximate the rear portion of the outer wall, the latch assembly selectively securing the lid only to the front portion of the outer wall of the body portion.

15. The waste container of claim 1 wherein the outer wall of the body portion includes a front portion opposite a rear portion, the lid hingeably mounted proximate the rear portion of the outer wall, the handle rotatably mounted to the lid closer to the front portion than to the rear portion of the outer wall.

16. The waste container of claim 15 wherein the lid is hingeably connected to a handle portion spaced rearwardly of an upper edge of the body portion.

17. The waste container of claim 16 further including a plurality of wheels rotatably connected to the body portion.

18. The waste container of claim 17 wherein the lower surface of the disk portion includes a recessed portion adjacent the cam portion, the cam portion including a ramp portion adjacent the recessed portion.

19. The waste container of claim 10 wherein the reinforcement ribs are spaced about ¼ of a width of the lid from the side edges of the lid.

20. The waste container of claim 17 wherein the lid is hingeably connected to a handle portion spaced rearwardly of an upper edge of the body portion.

21. The waste container of claim 7 wherein the interfering portions include a plurality of convex surfaces on at least one of the upper surface of the lid and the lower surface of the handle.

22. The waste container of claim 7 wherein the interfering portions include a plurality of bosses on at least one of the upper surface of the lid and the lower surface of the handle.

* * * * *